United States Patent
Wu et al.

(10) Patent No.: US 6,510,190 B1
(45) Date of Patent: Jan. 21, 2003

(54) METHOD AND APPARATUS FOR ESTIMATING FADING DISTORTION OF A SIGNAL PROPAGATING IN A COMMUNICATION CHANNEL

(75) Inventors: Jiangfeng Wu, Ottawa (CA); Jan Corneliu Olivier, Kanata (CA); Chengshan Xiao, Nepean (CA)

(73) Assignee: Nortel Networks Limited, St-Laurent (CA)

( * ) Notice: Subject to any disclaimer, the term of this patent is extended or adjusted under 35 U.S.C. 154(b) by 0 days.

(21) Appl. No.: 09/213,154

(22) Filed: Dec. 17, 1998

(51) Int. Cl.[7] .................................................. H04L 7/00
(52) U.S. Cl. ....................... 375/355; 375/346; 375/317; 375/284
(58) Field of Search ................................ 375/355, 346, 375/285, 284, 278, 254, 317; 370/317

(56) References Cited

U.S. PATENT DOCUMENTS 5,132,963 A * 7/1992 Ungerboeck ................ 370/286
5,596,608 A * 7/1997 Sassa et al. ................. 375/346
6,137,788 A * 10/2000 Swahashi et al. ........... 370/342

OTHER PUBLICATIONS

"An Analysis of Pilot Symbol Assisted Modulation for Rayleigh Fading Channels" by James K. Cavers, IEEE Transactions on Vehicular Technology, vol. 40, No. 4, pp 686–693, Nov. 1991.

* cited by examiner

Primary Examiner—Mohammad H. Ghayour

(57) ABSTRACT

The present invention relates to a method and an apparatus for compensating a signal that has experienced fading distortion in a communication channel. The signal that can be a TDMA (Time Division Multiple Access) signal includes slots that carry data symbols. Non-uniformly spaced pilot symbols are also embedded in the slot structure. The receiver separates the incoming symbols stream in two parts namely a pilot symbols stream and data symbols stream. Since the transmitted pilot symbols are known, an estimate of the channel distortion on the pilot symbols locations can be computed. This estimate is then interpolated to provide an estimate of the fading distortion at the data symbols locations, thus allowing to compensate accurately for the fading distortion in the channel.

16 Claims, 2 Drawing Sheets

METHOD AND APPARATUS FOR ESTIMATING FADING DISTORTION OF A SIGNAL PROPAGATING IN A COMMUNICATION CHANNEL

FIELD OF THE INVENTION

The present invention relates to signal processing and more particularly to a method and an apparatus for estimating the fading distortion to which a source signal is subjected when it is transported through a communication channel. This estimation allows compensating for the fading distortion on the data symbols at the receiver, thus improving performance.

DESCRIPTION OF THE PRIOR ART

PSK (phase shift keying) modulated signals may use non-uniformly or uniformly spaced pilot symbols that are embedded in the slot structure to permit coherent demodulation at the receiver. To permit successful demodulation, especially in fast fading channels, accurate fading information is necessary in order to compensate for the fading distortion.

A communication channel, such as a channel established between a mobile telephone and a base station experiences an undesirable fading phenomenon that is due to the relative movement of the telephone to the base station. The fading is the result of a change of phase as created by the Doppler effect. When all the spectral components of the source signal are affected in the same manner the distortion is called "flat fading".

The flat fading process, whose bandwidth is limited by the maximum Doppler frequency, is a slow process compared with the source signal bandwidth. For example, at 1.95 GHz carrier frequency, the maximum Doppler frequency is 184 Hz for a mobile moving at 100 km/hour, while the baud rate of signal is 24.3 kbaud/s for narrow band TDMA systems. Prior art receiver systems compensate for the fading process by passing the data symbols through a channel equalization module. Such a module usually has two operative stages namely training and tracking. The pilot symbols embedded in the slot structures of the signal are used to complete a training sequence. Once trained the channel equalization module can then compensate the signal carrying the data symbols to reduce the effect of the channel fading. The problem with this approach is that the tracking may become inaccurate when the channel is a fast fading one. As a result, the compensation process is not always sufficiently effective to overcome the distortions in the signal.

SUMMARY OF THE INVENTION

The present invention provides an apparatus for generating a control signal indicative of the level of distortion to which data symbols in a source signal are subjected when transported via a fading channel. The source signal includes pilot symbols at known locations. Those pilot symbols are non-uniformly spaced.

The apparatus includes a first processing functional block that receives the source signal. The first processing functional block estimates the fading distortion at the pilot symbols locations. The estimate is then passed to a second processing functional block that interpolates the results to the data symbols locations. The output of the second processing functional block is a control signal that can be used to drive a compensation module processing the received data symbols in order to reduce the effect of the fading process.

In a specific example, the second processing functional block includes an input to receive interpolation coefficients that allow the interpolation operation to be performed. These interpolation coefficients are computed offline. As a result, the computational complexity of the process is small, thus facilitating its implementation.

The invention also extends to a receiver for the source signal subjected to fading distortion, to a method for processing a source signal to compensate for fading distortion and to a communication system including a receiver that can compensate for a fading distortion on a source signal.

BRIEF DESCRIPTION OF THE DRAWINGS

These and other features of the present invention will become apparent from the following detailed description considered in connection with the annexed drawings. It is to be understood, however that the drawings are designed for purposes of illustration only and not as a definition of the limits of the invention for which a reference should be made to the appended claims.

DESCRIPTION OF A PREFERRED EMBODIMENT

Figure 1:
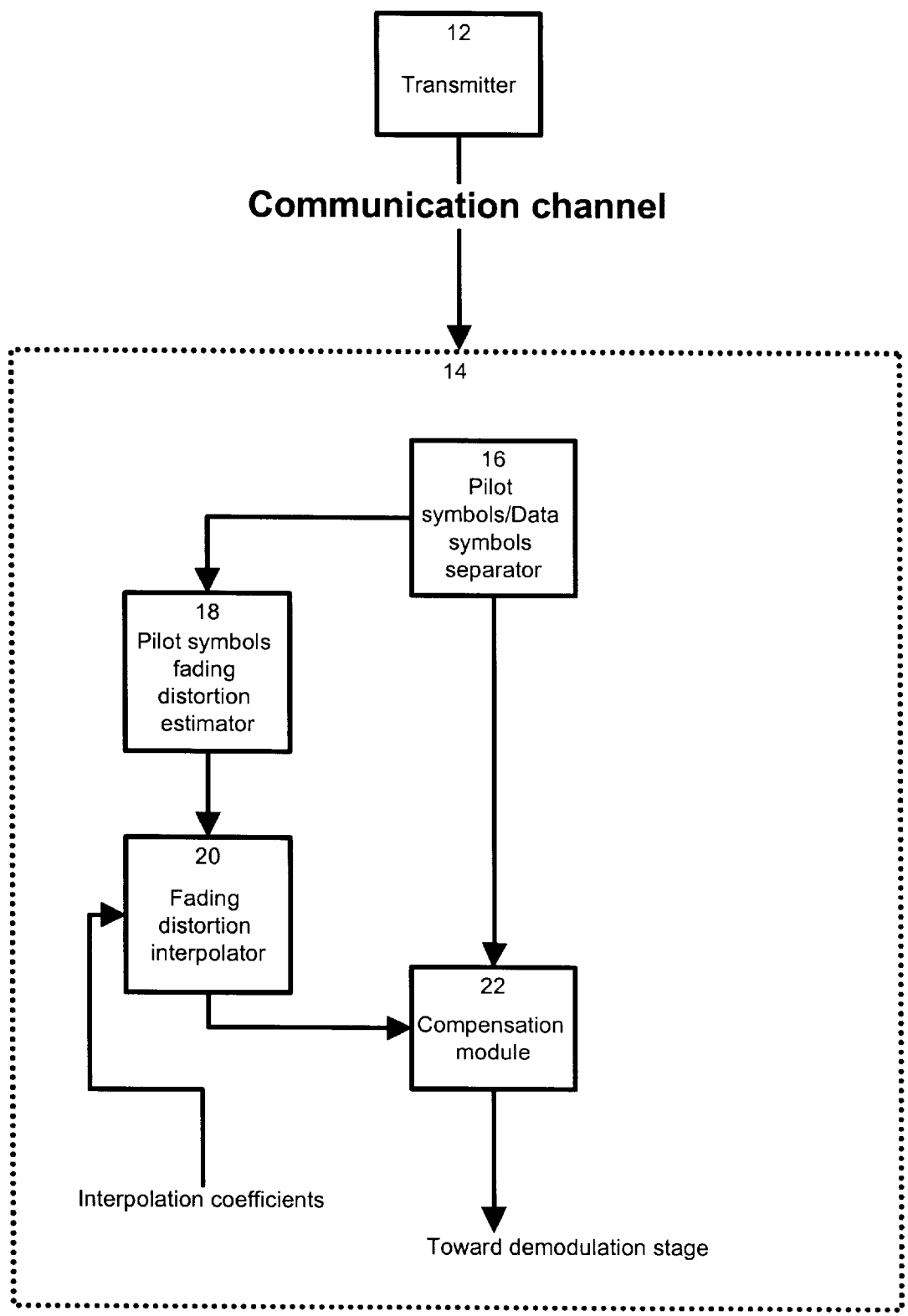
FIG. 1 is a block diagram of an apparatus for compensating the signal that has been subjected to a flat fading distortion.

FIG. 1 is a simplified block diagram of a communication system. The communication system includes a transmitter unit 12 that creates a source signal. In a specific example, the source signal is a narrow band TDMA signal that is modulated using the PSK modulating method. The signal includes pilot symbols at known and non-uniform locations in addition to the data symbols. The notion of pilot symbols and data symbols is known to a person skilled in the art and no further details are necessary here.

The signal is passed through a communication channel that typically is the air interface. When the transmitter is moving relative to the receiver, the Doppler effect creates a change in the phase of the source signal that, in turn, creates fading distortion.

The receiver identified by the reference numeral 14 receives the transmitted signal that has been the subject of the fading distortion. The input signal is first passed through a functional block 16 whose purpose is to separate the pilot symbols from the data symbols. The mode of operation of the functional block 16 and its implementation are known to the persons skilled in the art.

The stream of pilot symbols is directed to a first processing functional block 18 whose task is to estimate the fading distortion at the known non-uniformly spaced pilot symbols locations.

The signal received by the functional block 16 can be expressed as:

$$r[n]=u[n]x[n]+v[n]$$

where:
r[n] is the received signal
u[n] is the complex valued fading process
x[n] is the transmitted pilot and data symbols; and
t[n] is the Additive noise process Assume in one slot, the length of r[n] is N, pilots p[k] has length of K, and the pilot symbols are non-uniformly S scattered over N symbols. Since the transmitted pilot symbols are known, the fading distortion at the pilot symbol location $l_i$ can be extracted.

$$\hat{u}[l_i] = r[l_i]/p[i]$$

where:
the length of r[n] in one TDMA slot is N
the pilot symbols p[k] has a length of K
$\hat{u}[l_i]$ is the estimated fading distortion at pilot symbol location $l_i$.

If the noise $\upsilon[n]$ is zero, channel distortion at pilot symbols locations due to flat fading is accurately found. In all practical situations, $\upsilon[n]$ is not zero, and thus the fading distortion can only be estimated, even at pilot symbols locations.

The output of the first functional block 18 is the signal $$\hat{u}[l_i]$$

This signal is an estimation of the fading distortion at the pilot symbols locations.

This output signal is supplied to a second processing functioning block 20 that interpolates the results over the data symbols locations according the following equation:

$$\tilde{u}[n] = \sum_{i=1}^{K} h[n,i]\hat{u}[l_i]$$

In order to perform the above computation the term $$h[n,i]$$

that constitutes the interpolation coefficients is required.

The interpolation coefficients h[n,i] can be obtained in the following ways.

1. Minimum Mean Square Solution

Interpolation coefficients h[n,i] can be obtained by minimizing the mean square error $$E\{\|u[n] - \tilde{u}[n]\|^2\}$$

between fading process u[n] and its estimated version $\hat{u}[n]$. As an example of minimum mean square solution, the standard Wiener solution is used.

Denote $$H[n] = [h[n,1], h[n,2], \ldots h[n,K]]^T$$

where H[n] is a vector and $A^T$ represents the transpose of vector or matrix A. Using the standard Wiener solution, it can be shown that:

$$H[n] = M^{-1} w[n]$$

where the ijth element of matrix M is $$M_{ij} = \frac{1}{2} E\{u[l_j]\hat{u}*[l_i]\} = R_u((l_i - l_j)\Delta) + \frac{R_\upsilon((l_i - l_j)\Delta)}{E\{\|p\|^2\}}$$

and the ith element of vector w[n] is $$w_i = \frac{1}{2} E\{u^*[n]\hat{u}[l_i]\} = R_u((l_i - n)\Delta)$$

In the above two equations $R_u(t)$ is the autocorrelation function of u(t), $R_\upsilon(t)$ is the autocorrelation function of $\upsilon(t)$, $$E\{\|p\|^2\}$$

is the average power of the signal at the known pilot symbol locations, and $$\Delta$$

is the symbol sampling interval. For AWGN (Additive White Gaussian Noise), $R_\upsilon(t)$ is simplified as a Kroneker Delta.

To minimize the mean square error, second order statistics of the fading process and SNR (signal to additive noise ratio) are required. However in practical situation, obtaining these statistics is extremely difficult even if it is possible. As a practical matter an assumption can be made in this regard which is that the flat fading process has a Jakes' spectrum with a maximum Doppler frequency of 210 Hz. The calculated interpolation coefficients are used even when a flat fading process does not have a Jakes' spectrum or even when the Doppler frequency is far below 210 Hz (for example, as low as 0 Hz which represents a static channel. In other words, the interpolation coefficients are calculated offline, and no online training is necessary. The interpolation coefficients h[n,i] form a matrix that is constant and time-invariable. They can be computed off-line and stored in a simple memory of the receiver for use during the operation of the receiver. Thus a simple implementation can be realized.

2. Least Square Solution

Interpolation coefficients can also be obtained by an alternative approach. First, the same assumptions regarding channel statistics (the flat fading process has a Jakes' spectrum with a maximum Doppler frequency of 210 Hz) . Then using a large set of this type of slots, say of size Q, with known fading results obtained via either measurements or computer simulation, one can proceed as follows:

To find one row of the interpolation matrix, say h[j, ... ], the square error expressed below is minimized:

$$\varepsilon(j) = \sum_{k=1}^{Q} \left\| u_k[j] - \sum_{i=1}^{K} \hat{u}_k[l_i] h[j,i] \right\|^2$$

where u[j] denotes the known value of the fading at symbol positions j corresponding to row j of h[j, ... ] and k indicates the slot number of the set Q.

This minimization process is repeated for all rows to find h(j,i).

The size of Q is selected such that the values found for h[j,i] does not change with an increase in Q.

3. Polynomial Interpolation Method

Polynomial interpolation method is another possibility for computing the interpolation coefficients. Let $P_m(t)$ be an mth-order real-valued polynomial, and assume that the fading $\hat{u}(n)$ can be expressed by an Mth-order polynomial as follows:

$$\hat{u}[n] \equiv y[n\Delta] = \sum_{m=0}^{M} (c_m + jd_m) P_m(n\Delta)$$

Where $$\Delta$$

is the symbol-sampling interval. Consider the cost function given by:

$$J = \sum_{i=1}^{K} \|y[l_i\Delta] - \hat{u}[l_i]\|^2$$

then we have:

$$\frac{\partial J}{\partial c_m} = 2\sum_{i=1}^{K} P_m(l_i\Delta)\left(\sum_{m=0}^{M} c_m P_m(l_i\Delta) - \text{Re}(\hat{u}[l_i])\right)$$

$$\frac{\partial J}{\partial d_m} = 2\sum_{i=1}^{K} P_m(l_i\Delta)\left(\sum_{m=0}^{M} d_m P_m(l_i\Delta) - \text{Im}(\hat{u}[l_i])\right)$$

the necessary condition for minimizing J w.r.t. $c_m$ and $d_m$ for m=0,1 ... M is given by:

$$\sum_{m=0}^{M} c_m P_m(l_i\Delta) - \text{Re}(\hat{u}[l_i]) = 0, \quad i = 1, 2, \ldots, K$$

$$\sum_{m=0}^{M} d_m P_m(l_i\Delta) - \text{Im}(\hat{u}[l_i]) = 0, \quad i = 1, 2, \ldots, K$$

This condition can be expressed in a compact form:

$$\sum_{m=0}^{M} (c_m + jd_m)P_m(l_i\Delta) - \hat{u}[l_i] = 0, \quad i = 1, 2, \ldots, K$$

Moreover $$TC = \hat{U}$$

with $$T = \begin{bmatrix} P_0(l_1\Delta)P_1(l_1\Delta) \ldots P_M(l_1\Delta) \\ P_0(l_2\Delta)P_1(l_2\Delta) \ldots P_M(l_2\Delta) \\ \ldots \\ P_0(l_k\Delta)P_1(l_k\Delta) \ldots P_M(l_k\Delta) \end{bmatrix}, C = \begin{bmatrix} c_0 + jd_o \\ c_1 + jd_1 \\ \ldots \\ c_M + jd_M \end{bmatrix}, \hat{U} = \begin{bmatrix} \hat{u}[l_1] \\ \hat{u}[l_2] \\ \ldots \\ \hat{u}[l_k] \end{bmatrix}$$

Hence, $$C = T^*\hat{U}$$

where T* is the pseudo inverse of T.

It then follows that:

$$[h[n,1]h[n,2]\ldots h[n,K]] = [P_0(n\Delta)P_1(n\Delta)\ldots P_M(n\Delta)]T^*$$

The above equation demonstrates that the interpolation coefficients can be obtained without training procedure when the polynomials $P_m(t)$, m=1,2, ... , M are chosen. It is important to note that the interpolation coefficients are real numbers.

After the computation of the fading distortion estimation at the data symbol locations is completed, the estimation is passed as a control signal to a compensation module 22 that processes the faded data symbols in the source signal. The compensation module alters the data symbols to compensate for the fading distortion in accordance with the information conveyed by the control signal generated by the second processing functional block 20. It is not deemed necessary to describe the operation of the compensation module 22 because it is generally well-known to those of the arts.

Suffice it to say that the compensation module 22 multiplies the received data symbols with the conjugate of ũ[n]. In doing so, the phase distortion on the data symbols due to flat channel fading is compensated or removed.

Figure 2:
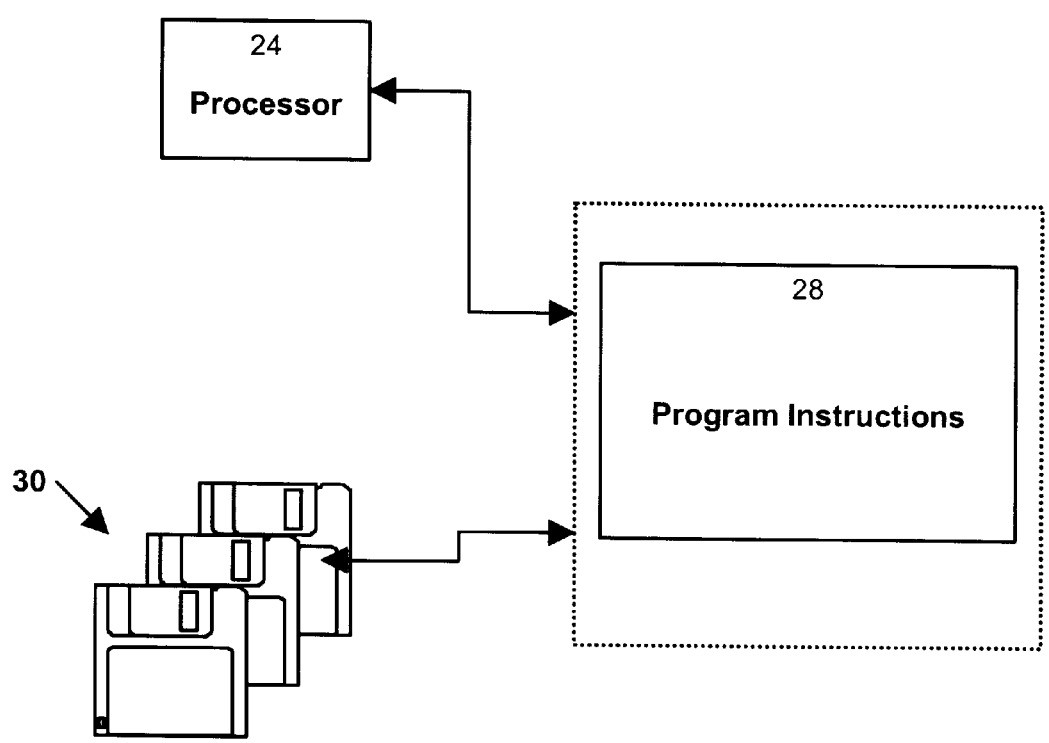
FIG. 2 is a block diagram of a computing apparatus to calculate interpolation coefficients.

FIG. 2 is a schematic block diagram of a computing apparatus that can be used to generate the interpolation coefficient that are input in the second functional processing block. The apparatus includes a processor 24 coupled to a memory to a segment that holds program instructions. The program instructions operate according to the methods described earlier and compute the interpolation coefficients that can then be stored on a suitable machine readable support medium that can be read, in order to supply this information to the second functional processing block 20.

The signal that is output by the compensation module 22 can then be supplied to the modulation stage of the receiver 14.

The functional blocks illustrated in FIG. 1 can be implemented on a digital signal-processing chip or with software on the suitable computing apparatus.

The above description of a preferred embodiment of the present invention should not be read in a limitative matter as refinements in variations are possible without departing from the spirit of the invention. The scope of the invention is defined in the appended claims and their equivalents.

We claim:

1. An apparatus for generating a control signal indicative of a level of distortion to which data symbols in a source signal are subjected as a result of flat fading when passing through a radio transmission channel, the source signal including non-uniformly spaced pilot symbols at known locations in the source signal, said apparatus including:

an input for receiving the source signal;

a first processing functional block coupled to said input for receiving the source signal, said first processing functional block being operative to estimate a level of distortion at pilot symbol locations in the source signal, said first processing functional block generating an output signal including data representative of the level of distortion at pilot symbol locations in the source signal;

a data storage medium storing a set of interpolation coefficients, said set of interpolation coefficients obtained as follows:

$$[h[n,1]h[n,2]\ldots h[n,K]] = [P_0(n\Delta)P_1(n\Delta)\ldots P_m(n\Delta)]T^*$$

$$T = \begin{bmatrix} P_0(l_1\Delta)P_1(l_1\Delta) \ldots P_M(l_1\Delta) \\ P_0(l_2\Delta)P_1(l_2\Delta) \ldots P_M(l_2\Delta) \\ \ldots \\ P_0(l_k\Delta)P_1(l_k\Delta) \ldots P_M(l_k\Delta) \end{bmatrix}$$

where:

$h[n, i]$ are the interpolation coefficients $P_m(t)$ is an mth-order real-valued polynomial $\Delta$ is the symbol sampling interval $l_i$ are the pilot symbol locations a second processing functional block coupled to said first processing functional block for receiving said output signal, said second processing functional block operative to estimate the level of distortion on data symbol locations in the source signal by interpolating the data representative of the level of distortion at pilot symbol locations in the source signal on the basis of said set of interpolation coefficients, said second processing functional block capable to generate the control signal, the control signal being capable to drive a compensation module processing at least a component of the source signal to compensate for the fading of the data symbols.

2. An apparatus as defined in claim 1, wherein the source signal is a TDMA signal.

3. An apparatus as defined in claim 2, wherein the interpolation coefficients are constant and obtained off-line.

4. An apparatus as defined in claim 2, wherein the source signal can be expressed as:

$$r[n]=u[n]x[n]+v[n]$$

where:

r[n] is the received signal
u[n] is the complex valued fading process
x[n] is the transmitted pilot and data symbols; and
u[n] is the additive noise process the data representative of the level of distortion at pilot symbol locations in the source signal can be expressed as:

$$\hat{u}[l_i]=r[l_i]/p[i]$$

where:

the length of r[n] in one TDMA slot is N
the pilot symbols p[k] has a lenght of K
$\hat{u}[l_i]$ is the estimated fading distortion pilot symbol location $l_i$.

5. An apparatus as defined in claim 4, wherein the control signal can be expressed as:

$$\tilde{u}[n] = \sum_{i=1}^{K} h[n, i]\, \hat{u}\,[l_i]$$

where $\hat{u}[l_i]$ is the estimated fading distortion at data symbol locations; and h[n,i] is the interpolation coefficient.

6. An apparatus as defined in claim 5, wherein h[n, i] is a constant coefficient.

7. An apparatus as defined in claim 5, wherein h[n, i] is time-invariant.

8. A receiver for a source signal transported through a radio communication channel, the source signal including pilot symbols at known locations in the source signal and including data symbols, the source signal being susceptible to fading when passing through the radio communication channel, said receiver including:

an input for receiving the source signal;

a first processing functional block coupled to said input for processing the source signal for estimating a level of distortion at pilot symbol locations in the source signal, said first processing functional block generating an output signal including data representative of the level of distortion at pilot symbol locations in the source signal;

a data storage medium storing a set of interpolation coefficients, said set of interpolation coefficients obtained as follows:

$$[h[n, 1]h[n, 2] \ldots h[n, K]] = [P_0(n\Delta)P_1(n\Delta) \ldots P_m(n\Delta)]T^*$$

-continued $$T = \begin{bmatrix} P_0(l_1\Delta)P_1(l_1\Delta) & \ldots & P_M(l_1\Delta) \\ P_0(l_2\Delta)P_1(l_2\Delta) & \ldots & P_M(l_2\Delta) \\ \ldots & & \\ P_0(l_k\Delta)P_1(l_k\Delta) & \ldots & P_M(l_k\Delta) \end{bmatrix}$$

where:

h[n, i] are the interpolation coefficients $P_m(t)$ is an mth-order real-valued polynomial $\Delta$ is the symbol sampling interval $l_i$ are the pilot symbol locations a second processing functional block coupled to said first processing functional block for receiving said output signal, said second processing functional block operative to estimate the level of distortion on data symbol locations in the source signal by interpolating the data representative of the level of distortion at pilot symbol locations in the source signal on the basis of said set of interpolation coefficients, said second processing functional block capable to generate the control signal;

a compensation module coupled to said second processing functional block for receiving the control signal, said compensation module including an input for receiving data symbols from the source signal, said compensation module being responsive to the control signal to process the data symbols from the source signal to compensate for the fading occurring in the radio communication channel.

9. A receiver as defined in claim 8, wherein the pilot symbols in the source signal are non-uniformly spaced.

10. A receiver as defined in claim 9, wherein the source signal is a TDMA signal.

11. An apparatus for generating a control signal indicative of a level of distortion to which data symbols in a source signal are subjected as a result of fading when passing through a radio transmission channel, the source signal including non-uniformly spaced pilot symbols at known locations in the source signal, said apparatus including:

an input for receiving the source signal;

a first processing functional block coupled to said input for receiving the source signal, said first processing functional block being operative to estimate a level of distortion at pilot symbol locations in the source signal, said first processing functional block generating an output signal including data representative of the level of distortion at pilot symbol locations in the source signal;

a data storage medium storing a set of interpolation coefficients, said set of interpolation coefficients obtained as follows:

$$[h[n, 1]h[n, 2] \ldots h[n, K]]^T = M^{-1}w[n]$$

$$M_{ij} = R_u((l_i - l_j)\Delta) + \frac{R_v((l_i - l_j)\Delta)}{E\{\|p\|^2\}}$$

$$w_i = R_u((l_i - n)\Delta)$$

where:

h[n, i] are the interpolation coefficients $R_u$ is the autocorrelation function of u(t)

-continued $u(t)$ is the fading process $R_v$ is the autocorrelation function of $v(t)$ $v(t)$ is the additive noise process $\Delta$ is the symbol-sampling interval $l_i$ and $l_j$ are the pilot symbol locations $E\{\|p\|^2\}$ is the average power of the signal at the known pilot symbol locations a second processing functional block coupled to said first processing functional block for receiving said output signal, said second processing functional block operative to estimate the level of distortion on data symbol locations in the source signal by interpolating the data representative of the level of distortion at pilot symbol locations in the source signal on the basis of said set of interpolation coefficients, said second processing functional block capable to generate the control signal, the control signal being capable to drive a compensation module processing at least a component of the source signal to compensate for the fading of the data symbols.

12. A communication system comprising;

a transmitter for generating a source signal including pilot symbols at known locations and data symbols;

a receiver capable of being coupled to said transmitter by a communication channel, the communication channel being characterized by an ability to subject the source signal to flat fading distortion, said receiver including:

an input for receiving the source signal;

a first processing functional block coupled to said input for processing the source signal for estimating a level of distortion at pilot symbol locations in the source signal, said first processing functional block generating an output signal including data representative of the level of distortion at pilot symbol locations in the source signal;

a data storage medium storing a set of interpolation coefficients, said set of interpolation coefficients obtained as follows:

$$[h[n,1]h[n,2] \ldots h[n,K]] = [P_0(n\Delta)P_1(n\Delta) \ldots P_m(n\Delta)]T^*$$

$$T = \begin{bmatrix} P_0(l_1\Delta)P_1(l_1\Delta) \ldots P_M(l_1\Delta) \\ P_0(l_2\Delta)P_1(l_2\Delta) \ldots P_M(l_2\Delta) \\ \ldots \\ P_0(l_k\Delta)P_1(l_k\Delta) \ldots P_M(l_k\Delta) \end{bmatrix}$$

where:

$h[n, i]$ are the interpolation coefficients $P_m(t)$ is an mth-order real-valued polynomial $\Delta$ is the symbol-sampling interval $l_1$ are the pilot symbol locations a second processing functional block coupled to said first processing functional block for receiving said output signal, said second processing functional block operative to estimate the level of distortion on data symbol locations in the source signal by interpolating the data representative of the level of distortion at pilot symbol locations in the source signal on the basis of said set of interpolation coefficients, said second processing functional block capable to generate the control signal;

a compensation module coupled to said second processing functional block for receiving the control signal, said compensation module including an input for receiving data symbols from the source signal, said compensation module being responsive to the source signal to process the data symbols from the source signal to compensate for the fading occurring in the radio communication channel.

13. A communication system as defined in claim 12, wherein the pilot symbols in the source signal are non-uniformly spaced.

14. A communication system as defined in claim 13, wherein the source signal is a TDMA signal.

15. A communication system as defined in claim 14, wherein the interpolation coefficients are constant and obtained off-line.

16. An apparatus for generating a control signal indicative of a level of distortion to which data symbols in a source signal are subjected as a result of fading when passing through a radio transmission channel, the source signal including non-uniformly spaced pilot symbols at known locations in the source signal, said apparatus including:

an input for receiving the source signal;

a first processing functional block coupled to said input for receiving the source signal, said first processing functional block being operative to estimate a level of distortion at pilot symbol locations in the source signal, said first processing functional block generating an output signal including data representative of the level of distortion at pilot symbols locations in the source signal;

a data storage medium storing a set of interpolation coefficients, said set of interpolation coefficients obtained by minimizing the square error function expressed below:

$$\varepsilon(j) = \sum_{k=1}^{Q} \left\| u_k[j] - \sum_{i=1}^{K} \hat{u}_k[l_i]h[j,i] \right\|^2$$

where:

$h[j, i]$ are the interpolation coefficients $u_k(j)$ denotes the known value of the fading at symbol positions $j$ corresponding to row $j$ of $h[j, \ldots]$ $\hat{u}_k[l_i]$ is the estimated fading distortion at pilot symbol location $l_i$ $Q$ indicates the size of a set of slots $K$ indicates the slot number of the set of slots a second processing functional block coupled to said first processing functional block for receiving said output signal, said second processing functional block operative to estimate the level of distortion on data symbol locations in the source signal by interpolating the data representative of the level of distortion at pilot symbol locations in the source signal on the basis of said set of interpolation coefficients, said second processing functional block capable to generate the control signal, the control signal being capable to drive a compensation module processing at least a component of the source signal to compensate for the fading of the data symbols.

* * * * *